Patented July 3, 1928.

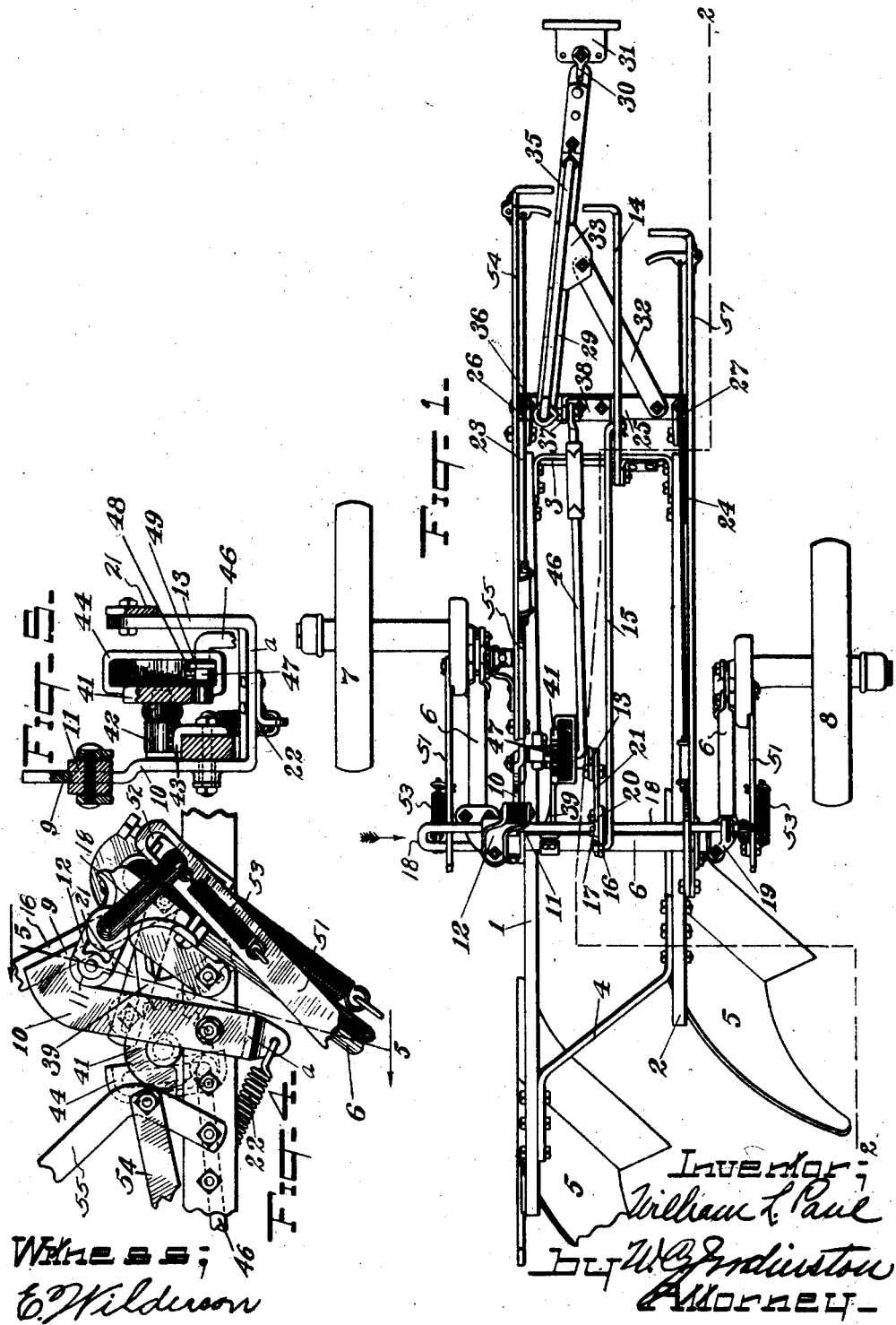

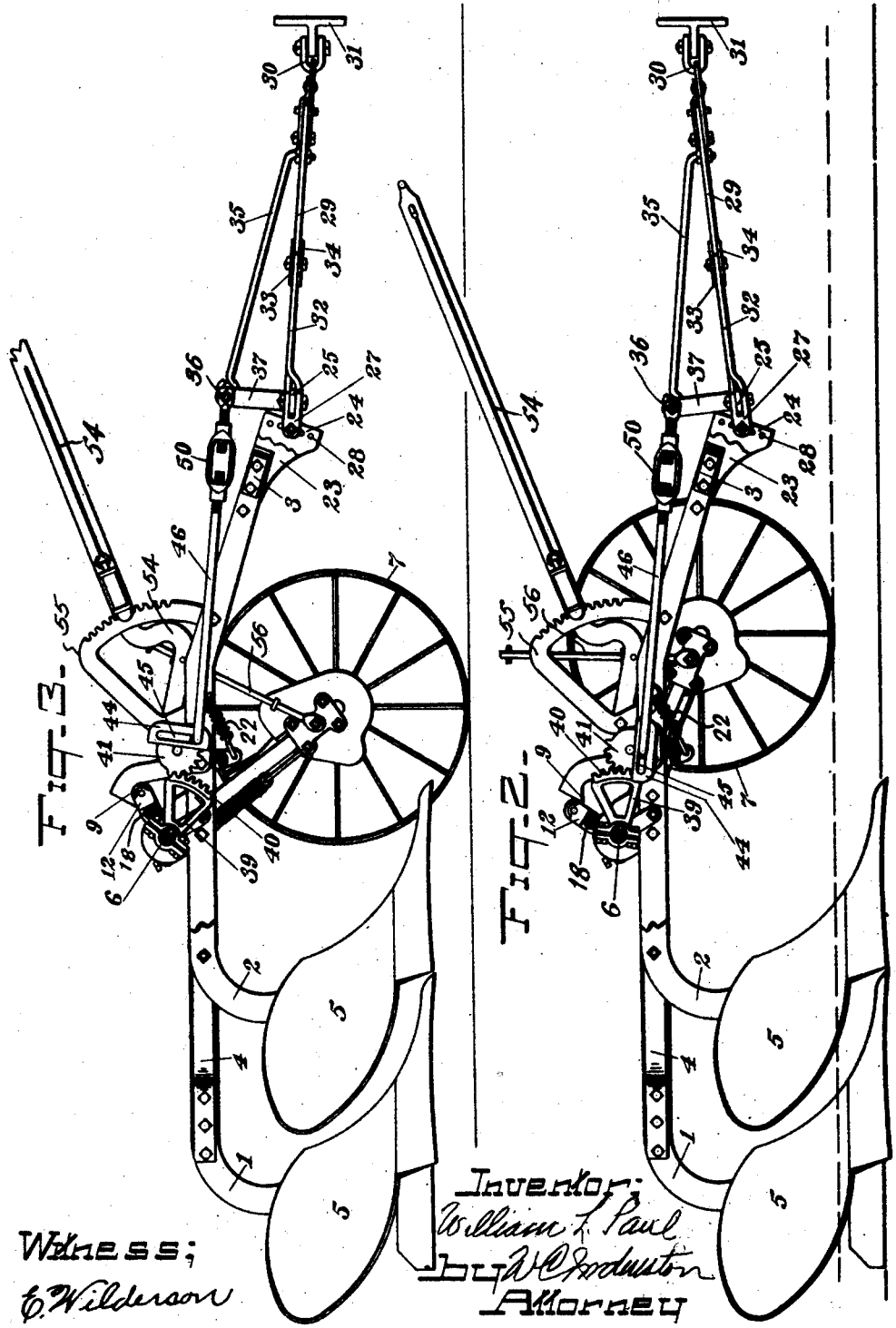

1,675,461

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

HITCH DEVICE.

Application filed July 13, 1921, Serial No. 484,412. Renewed March 16, 1925.

My invention relates to tractor drawn plows and more particularly to the type of hitch employed to connect the plow to the tractor. The object of my invention is to provide a hitch simple in operation, economical in construction, and which is vertically flexible when the plow is in operation and rigid against such flexibility when the plow is raised.

Referring to the drawings in which similar numerals indicate identical parts:—

Figure 1 is a plan view of a wheeled plow embodying my invention.

Figure 2 is a side elevation in part section on the line 2—2 of Figure 1 illustrating the position of the parts with the plow in operation.

Figure 3 is a similar view to Figure 2 showing the position of the parts with the plow raised.

Figure 4 is an enlarged detail view of some of the operative parts connected to the axle taken from the direction indicated by the arrow in Figure 1, and Figure 5 is a detail section on the line 5—5 of Figure 4.

I have shown my device as applied to a power lift plow having a frame composed of plow beams 1 and 2 rigidly connected forwardly by a transverse bar 3 and rearwardly by a brace 4 and on each beam is mounted a plow body 5. The plow is supported on a transverse axle 6 having crank ends on which are journaled respectively a land wheel 7 and a furrow wheel 8. The axle 6 is rockably mounted in bearings on the frame in advance of the plow bodies, and is rotated to lift the plow either by traction power or by manually operated levers of any of the types shown in the art. The drawings, which exemplify one of the various types of plows to which my improvements may be applied, illustrate some of the parts of a power lift mechanism of the "lock lift" type similar in some respects to that shown and described in the application of Theophilus Brown and Carl G. Strandlund, filed July 3, 1920, Serial No. 393,823, and characterized by the provision of means for locking the wheels to the crank axle to effect the lifting of the plow out of operative position, the wheels being adapted normally to rotate independently of the crank axle. In such machines it is common to use ratchet wheels at both sides of the plow structure and to provide pawls normally out of engagement with such ratchet wheels, but movable into engagement therewith at the option of the operator to lock the wheels to the crank axle. As the "lock lift" type of plow is well known in the art I have not considered it necessary to illustrate such mechanism in detail, but have shown only such parts as will suffice to indicate the general character of the power lift mechanism. In the construction illustrated when lifted the plow is held up by a hook end 9 of an arm 10, pivotally mounted on the beam 1, engaging with an anti-friction roller 11 which is mounted on an arm 12 rigidly secured on the axle 6 and rockable therewith. The arm 10 is pivoted, intermediate its length, on the beam 1, and below its pivot extends under the beam 1 toward the longitudinal center of the plow and is provided with an upwardly extending arm 13.

A manually operable lever 14 is pivotally mounted on the bar 3 and above the pivot a rod 15 is connected thereto and extends rearwardly to a standard 16 integral with a member 17. The member 17 is rigidly secured on a road 18 extending transversely of the plow and supported in a bearing on the arm 12 and a similar bearing on a bracket 19 on the axle 6. The member 17 has a downwardly extending arm 20, a link 21 is pivotally connected to the arm 20 and to the arm 13; a coiled spring 22, secured to the horizontal part $a$ of the arm 10 and to the beam 1, exerts its tension to hold the hook end 9 in constant position to engage with the roller 11. It will be apparent that by moving the lever 14 downward the frame comprising the arms 13 and 10 may be rocked to move the hook end 9 from the roller 11 to permit the plow to drop. In the construction illustrated the plow beam structure is lifted by the rocking of the crank axle 6 effected by connecting the wheels 7, 8 non-rotatably with it through ratchet mechanism as hereinbefore suggested, the dog elements of such ratchet mechanism being normally held out of operative position by bars 51 having slots 52 at their upper ends, as shown in Fig. 4, said bars being normally held in their inoperative position shown in said figure by springs 53. As therein shown the rod 18 extends through the slots 52 and normally bears against the lower ends of said slots due to the action of said springs. By this arrangement said rod may be rocked to a small extent without actuating the bars 51, but when rocked further will move said bars upward, thereby permitting the dogs to engage the ratchet wheels with which they cooperate and lock the ground wheels to the crank axle so that by further rotation of said wheels the axle will be rocked to lift the plow. The plowing depth is regulated by means of a lever 54 having the usual locking dog adapted to cooperate with a notched sector 55 and having sliding connection with a rod 56 connected at its lower end with the crank axle 6 adjacent to the furrow wheel 7, as shown in Fig. 3. This arrangement for depth adjustment is well known in the art, and, therefore, need not be further described. A leveling lever 57 is also provided, as shown in Fig. 1, which is provided with the usual connections for that purpose.

A plate 23 is secured to the forward end of the beam 1 and a similar plate 24 is secured to the forward end of the beam 2. A bar 25 extends transversely forwardly of the plates 23 and 24 and is secured thereto by clevises 26 and 27 which are pivotally connected to the plates 23 and 24 to permit vertical movement of the bar 25. Suitable holes 28 are provided in the plates 23 and 24 for any vertical adjustment of the clevises necessary. A draft bar 29 is secured to the transverse bar 25 adjacent the landward end thereof and extends forwardly to pivotal connection with a coupling 30 which is pivotally secured to a draft element 31 rigidly mounted on a tractor. A brace 32 is connected to the bar 25 and extends angularly toward the draft bar 29 and is bolted between plates 33 and 34 secured respectively on opposite sides of the draft bar 29. A brace 35 is secured at its forward end to the draft bar 29 and extends rearwardly in the vertical plane of the draft bar 29, and a hook is formed on its rear end to engage with an eyebolt 36, the latter mounted on the upper end of a strut or standard 37 which has a horizontal portion 38 bolted to the bar 25.

A sector 39 is rigidly mounted on the axle 6 and has a series of teeth 40 on its arc which mesh with the teeth of a gear 41, the latter secured on a stub shaft journaled in a bearing 42 integral with a bracket 43 rigidly mounted on the beam 1. Preferably integral with the gear 41, and projecting from the furrowward side thereof, is a member 44 having a side, parallel with the side of the gear 41, in which there is a slot 45. Manifestly as the sector 39 is rigidly secured to the axle 6 it rocks with it when said axle is rocked to raise or lower the plow bodies, and as the gear 41 meshes with the sector 39 said gear also rocks. The parts are so arranged that when the plow bodies are in operative position the slot 45 is disposed longitudinally of the machine, as shown in Fig. 2, but when the crank axle is rocked to lift the plow bodies out of operative position the rocking of the sector 39 and gear 41 incident to such operation turns the gear 41 through an arc of approximately ninety degrees so that when the plow bodies are in transport position the slot 45 is approximately vertical as shown in Fig. 3. The gear 41 is at all times held against rotation except as it is moved by the rocking of the crank axle. A rod 46 has an end portion 47 bent to project through the slot 45 and is held from withdrawal therefrom by a pin or cotter 48 between which and the slot 45 is interposed a washer 49. The rod 46 extends forwardly and is formed of two sections joined together by a turn-buckle 50; the forward section of the rod 46 is pivotally connected to the standard 37 by the stem of the eyebolt 36, which projects therethrough, and is secured by a nut.

In plows of this type the overhanging weight of the plow bodies in the rear of the ground wheels tends to rock the front end of the plow upwardly when the plow is being transported, but as will be understood from the foregoing description, by my improved construction I have provided means that will hold the plow in the proper or level position when being transported, and when the plow is at work will allow of sufficient slack or flexibility between the beam frame and the hitch element to permit of the variations in level that occur between the plow and tractor in the ordinary course of plowing. For example, when the plow is down in operative position, as shown in Fig. 2, the slot 45 assumes an approximately horizontal position and is in substantial alinement with the rod 46, so that under such conditions said rod is free to move fore and aft in said slot. At that time the draft bar 29 is inclined downwardly toward the rear and is at a pronounced angle to the front end portion of the beam structure, while the rod 46 and brace 35 are approximately alined. The hitch connection of the plow to the tractor is then perfectly flexible vertically, as well as laterally, since the rod 46 being free to move fore and aft does not affect the pivotal connections of the clevises 26, 27 with the beam structure. When, however, the axle 6 is rocked to raise the plow, the sector 39 rocks the gear 41 in a counter-clockwise direction as viewed in Fig. 2, thereby turning the member 44 to carry the slot 45 to an approximately vertical position, this position being reached when the plow has been raised to its highest point, so that the position of the slot 45 is then approximately at right angles to the position it assumes when the plow is down. As the member 44 rocks in this manner, the range of fore and aft movement of the rod 46 is reduced, and consequently the extent to which the beam structure may rock is also reduced as the plow rises, this reduction continuing until when the plow reaches or approximates its uppermost position, the flexibility of the connection between the beam structure and the draft connections comprising the draft bar 29 and brace 32 is entirely eliminated. In other words, when the plow is in working position there are two horizontal pivotal points between the beam structure and the draw-bar of the tractor, whereas when the plow is in its transport position there is only one such pivotal connection, and, moreover, the beam structure is locked against vertical oscillation in either direction when in transport position, which is an important advantage of my improved construction, because in traveling over rough ground, such as irrigation ditches, checks and plow furrows, the plow may be inclined to tilt forwardly, which is objectionable, and is prevented by the construction described. The advantage of gradually reducing the extent to which the beam structure may rock as the plow is lifted from its operative position is that in that way the rear end of the plow will not droop close to the ground while it is being lifted, but will be carried at a sufficient height to give good clearance. When the plow reaches its transport position, it is held up by the engagement of the hook 9 with the roller 11 until the arm 10 is rocked by operation of the lever 14 to release said hook to drop the plow. The rigid relation of the draft bar to the plow frame is maintained so long as the plow is held up out of operative position, but when the plow is again lowered the parts are restored to the position shown in Fig. 2, and the flexible relation of the plow to the draft bar is restored.

From the foregoing description it will be seen that by my invention I provide sufficient flexibility between the beam structure and the draft element for plowing purposes; I provide sufficient clearance for the plow bodies during the lifting operation, and I provide a connection between the beam structure or plow carrying frame and the hitch device that is rigid vertically in both directions when the plow is raised to its transport position.

It will be understood that my invention may be embodied in other forms than that shown and specifically described, and the claims hereinafter made are intended to include such variations or modifications thereof as would occur to those skilled in the art.

What I claim is—

1. In a tractor plow, the combination with a crank axle and supporting wheels, of means to rock the axle to raise and lower the plow, a hitch device adapted to connect the plow with a tractor and including a draft bar pivoted to the plow for vertical swinging a standard on the rear of the hitch device, a brace extending from said standard forwardly to connection with the draft bar, a rotatable member supported on the plow, means for rotating said member by the raising or lowering of the plow, and a rod pivotally connected to said standard and having a connection with said member adapted to permit said rod to move longitudinally while said member remains in one position, and to hold said rod against longitudinal movement when said member is rotated to another position.

2. In a tractor plow, the combination with a crank axle and supporting wheels, of means to rock the axle to raise and lower the plow, a hitch device adapted to connect the plow with a tractor and including a draft bar pivoted to the plow for vertical swinging, a standard on the rear of the hitch device, a brace extending from said standard forwardly to connection with the draft bar, a rotatable member supported on the plow, means actuated by the raising or lowering of the plow for rotating said member, and a rod pivotally connected to said standard and having a connection with said member adapted to permit said rod to move longitudinally while said member remains in one position, and to hold said rod against longitudinal movement when said member is rotated to another position.

3. In a tractor plow, the combination with a crank axle and supporting wheels, of means to rock the axle to raise and lower the plow, a hitch device adapted to connect the plow with a tractor and including a draft bar pivoted to the plow for vertical swinging, a transverse bar on the rear of the draft bar, a standard mounted on the transverse bar, a brace extending from said standard forwardly to connection with the draft bar, a rotatable member supported on the plow, a rod pivotally connected to said standard and having a longitudinally movable connection with said member when the plow is in operation, and means on the axle connected with said member and adapted to rotate the latter and hold said rod immovable and the hitch device rigid by rocking the axle to raise the plow.

4. In a tractor plow, the combination with a crank axle and supporting wheels, of means to rock the axle to raise or lower the plow, a hitch device adapted to connect the plow with a tractor and including a draft bar pivoted to the plow for vertical swinging, a rotatable member mounted on the plow, a slot in said member horizontally disposed when the plow is in operation, a rod pivotally connected with the draft bar and extending rearwardly to slidable engagement with said slot, and means on the axle connected with said member to rotate the latter whereby the slot is turned to a vertical position and said rod and draft bar are held rigid when the axle is rocked to raise the plow.

5. In a tractor wheeled plow, the combination with means to raise and lower the plow, of a hitch device including a draft bar pivotally connected to the plow and free to oscillate vertically when the plow is lowered, and means actuated by the lifting of the plow to rock said draft bar rigidly with the plow when the latter is raised.

6. In a tractor wheeled plow, the combination with means to raise and lower the plow, of a hitch device including a draft bar pivotally connected to the plow and free to oscillate vertically when the plow is lowered, and means to automatically lock said draft bar rigidly with the plow when the latter is raised.

7. In a tractor wheeled plow having a rockable crank axle, the combination with means operable to raise and lower the plow by rocking the axle, a hitch device including a draft bar pivotally connected to the plow and free to oscillate vertically when the plow is lowered, and means connecting the draft bar with the axle and operating to lock said draft bar and plow rigidly together when the latter is raised.

8. In a plow, the combination of a plow body carrying frame, a wheeled support therefor arranged to rock fore and aft to raise or lower the plow, a draft connection at the front of said frame and connected therewith to swing vertically relatively thereto when the plow is in working position, means operable and operating to reduce the extent to which said frame may swing vertically in either direction, and means for actuating the latter means by the rocking of said support to lift the plow.

9. In a plow, the combination of a plow body carrying frame, a wheeled support therefor arranged to rock fore and aft to raise or lower the plow, a draft connection at the front of said frame and connected therewith to swing vertically relatively thereto when the plow is in working position, means operable to hold said draft connection and the frame against relative vertical swinging in either direction, and means for actuating the latter means by the rocking of said support to lift the plow to transport position.

10. In a plow, the combination of a plow body carrying frame, a wheeled support therefor arranged to rock fore and aft to raise or lower the plow, a draft connection at the front of said frame and connected therewith to swing vertically relatively thereto when the plow is in working position, means operable to hold said draft connection and the frame against relative vertical swinging in either direction, and means for actuating the latter means by the rocking of said support to lift the plow to transport position.

11. In a plow, the combination of a plow body carrying frame, a wheeled support therefor arranged to rock fore and aft to raise or lower the plow, a draft connection at the front of said frame and connected therewith to swing vertically relatively thereto when the plow is in working position, means operable to gradually reduce the range of relative vertical movement in either direction of the frame and draft connection as the plow rises, and means for actuating the latter means by the rocking of said support to lift the plow.

12. In a plow, the combination of a plow body carrying frame, a wheeled support therefor arranged to rock fore and aft to raise or lower the plow, a draft connection pivotally connected with a draft element and with said frame to swing vertically, and means actuated by the lifting of the plow for preventing swinging of said draft connection about its connection with the frame when the plow is raised to transport position.

13. In a plow, the combination of a plow body carrying frame, a wheeled support therefor arranged to rock fore and aft to raise or lower the plow, a draft connection pivotally connected with a draft element and with said frame to swing vertically, and means actuated by the lifting of the plow for preventing swinging of said draft connection relatively to the frame when the plow is raised to transport position.

14. In a plow, the combination of a wheeled support, a plow body carrying frame supported thereby and movable upward to transport position and downward to operative position, a draft connection pivotally connected with said frame for vertical swinging, and means actuated by the lifting of said frame for substantially preventing vertical swinging of said draft connection relatively thereto when the plow is raised to transport position.

WILLIAM L. PAUL.